United States Patent [19]

Yu

[11] Patent Number: 5,068,973
[45] Date of Patent: Dec. 3, 1991

[54] MULTIPOINT MEASURING SYSTEM WITH MEASURING MECHANISM FOR FAST EXCHANGING OF CHUCKING APPLIANCE AND AUTOMATIC MATERIAL WITHDRAWAL

[76] Inventor: Dave Yu, No. 39, Pao-hsin Road, Hsin-tien, Taiwan

[21] Appl. No.: 515,138

[22] Filed: Apr. 26, 1990

[51] Int. Cl.⁵ .............................................. G01B 3/20
[52] U.S. Cl. ...................................... 33/549; 33/548; 33/573
[58] Field of Search .......... 33/783, 803, 805, 810–812, 33/548, 549, 573

[56] References Cited

U.S. PATENT DOCUMENTS 2,820,300  1/1958  Gadomski ......................... 33/803 X
4,599,801  7/1986  Kronzer et al. ................... 33/548 X

FOREIGN PATENT DOCUMENTS 0890426  9/1953  Fed. Rep. of Germany .

Primary Examiner—Harry N. Haroian
Attorney, Agent, or Firm—Armstrong, Nikaido, Marmelstein, Kubovcik and Murray

[57] ABSTRACT

A multipoint measuring system with measuring mechanism for fast exchanging of chucking appliance and automatic material withdrawal, comprises several slide guides arranged respectively at two side plates to use the three dimensional space to build several sets of measuring components so as to meet the requirement of measuring dimensions synchronously; the measuring implement for fast changing of chucking device and easy operation has a micro adjustment set which is provided at the end of a measuring base, and the said micro adjustment set can make further suitable adjustment to the position of measuring base by means of turning the bolt rod which is arranged on the measuring probe unit, so that it will be more easy, convenient and accurate during resetting operation; an automatic material withdrawal device consists of one set of rocket arm pin and the objects to be measured can be withdrawn to the measuring position by means of the oscillation motion of the said rocker arm pin.

7 Claims, 6 Drawing Sheets

MULTIPOINT MEASURING SYSTEM WITH MEASURING MECHANISM FOR FAST EXCHANGING OF CHUCKING APPLIANCE AND AUTOMATIC MATERIAL WITHDRAWAL

The above-mentioned system is characterized in that it can make three dimensional spacial measurement and fast changing and easy operate the measuring device with function of automatic material withdrawal so as to increase productivity and purchase capability.

BACKGROUND OF THE INVENTION

The present invention is related to a multipoint measuring system with measuring mechanism for fast exchanging of chucking appliance and automatic material withdrawal, especially it is related to a measuring system which comprises several slide guides arranged respectively at two side plates to use the three dimensional space to build up several sets of measuring components so as to meet the requirement of measuring dimensions synchronously; and the measuring device for fast changing of chucking device and easy operation has a micro adjustment set which is provided at the end of a measuring base for more convenient and accurate resetting operation, at the same time, the said measuring base can be synchronously adjusted at the left and right sides so that it can make diversified measuring jobs of the objects to be measured, and the automatic material withdrawal device comprises a set of rocker arm pin, so that the objects after measurement can automatically be withdrawn from the measuring position by means of the angle movement by the oscillation of rocker arm pin.

It is well known that a multipoint measuring system is to measure dimensions by means of measuring probes of the several sets of measuring base arranged on the base plane, which are provided at the different positions of the both sides of the objects to be measured, at the same time in coordination with some digital quantizers the measuring status will be displayed on a monitor screen and/or printer etc. electronic and computer installation and recorded for statistical analysis. Such kind of measuring implements can only do the axial measurement jobs due to its mechanical construction, and if one wants to do other radial measurement or measure different angles and directions, one should do extra measurement and such measurements are limited.

Besides, prior to measure jobs, there is an important job one has to do, namely the resetting of the measuring probes, they should be set at the right measuring position, otherwise one is impossible to make accurate measurement of the objects to be measured. However, the conventional resetting method is to move the position of measuring base by means of a water feel device and then see the information on the display to carry out the resetting job and finally fix the set screw on the measuring base. But when one fixes the measuring base, such movement will often result resetting tolerance due to the high sensitivity of the measuring probes, in such case one must do it again and it is quite inconvenient. In addition to this, the said measuring device should do multipoint measurement and each measuring base is independently arranged and should be matched on both sides in pairs, therefore, it will cost much time for position adjustment. For this reason, it is suitable for measuring the objects which are with same types and mass quantity, for it is no need to make adjustment all the time. Therefore, such kind of measuring devices are not suitable for measuring the objects of diversity and small quantity, so the consumers are hesitating to use the same. Besides, such measuring device will hold the objects to be measured at the position to be measured, and after completing the measuring job, the measurer himself should change another object to be measured, then continue his measuring job and one wastes more time for disassembling and fixing job than measuring job, this will not meet the economic requirement and is the disadvantage of the said measuring device on its application.

SUMMARY OF THE INVENTION

In view of said problem, the present invention is thus created. The main object of the present invention is to provide a measuring device and at both of the side plates of its base several sets of slide guides are respectively provided, so that the measuring space will be fully utilized from the single unit into three dimensional several sets of measurement devices so as to meet the requirement for measuring several dimensions synchronously. Besides, the position of each slide guide is located in advance by measuring center, once they are respectively screwed on the two side plates, they can do their measuring jobs accordingly.

Another object of the present invention is to provide a mechanism that by means of its effect of adjustment and maintenance it will be more convenient, fast and accurate for making the resetting job.

A yet further object of the present invention is to provide a rock arm pin to hold the object to be measured, whereby the lifting pins at its both sides are fixed on a radial axle and the said radial axle is arranged on a fixed base of its base body. Therefore, it can bring the object to be measured to make oscillation motion, so that after measurement job, it can bring the object to be measured away from the position of measurement automatically and thus the measuring person is easy to change the object to be measured to achieve the convenient and fast application effectiveness.

DETAILED DESCRIPTION OF THE PREFERRED EMBODIMENTS

The above-described and other objects, features and advantages of the present invention will be more apparent from the following description quoted on the basis of annexed drawing.

Figure 1:
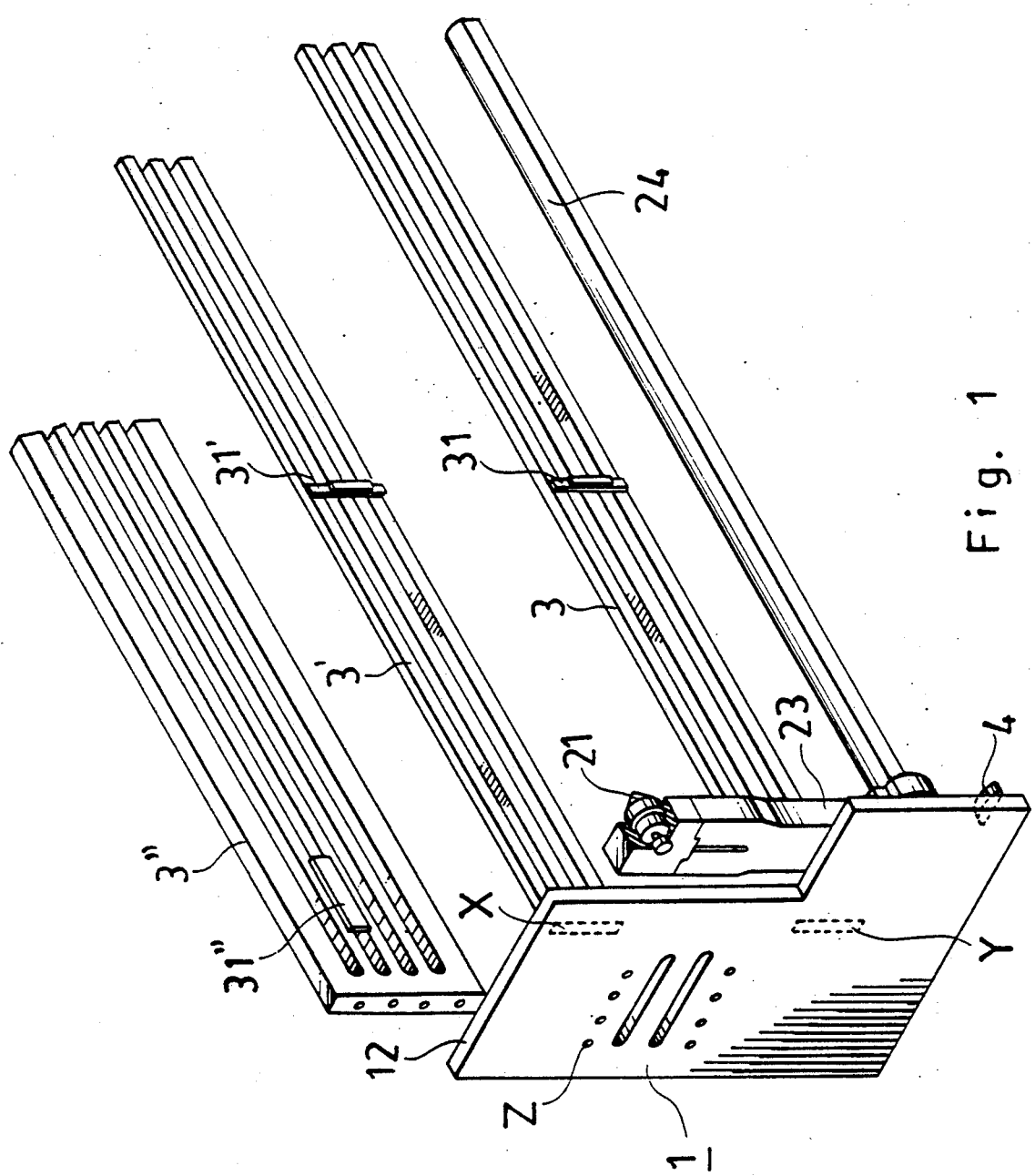
Figure 2:
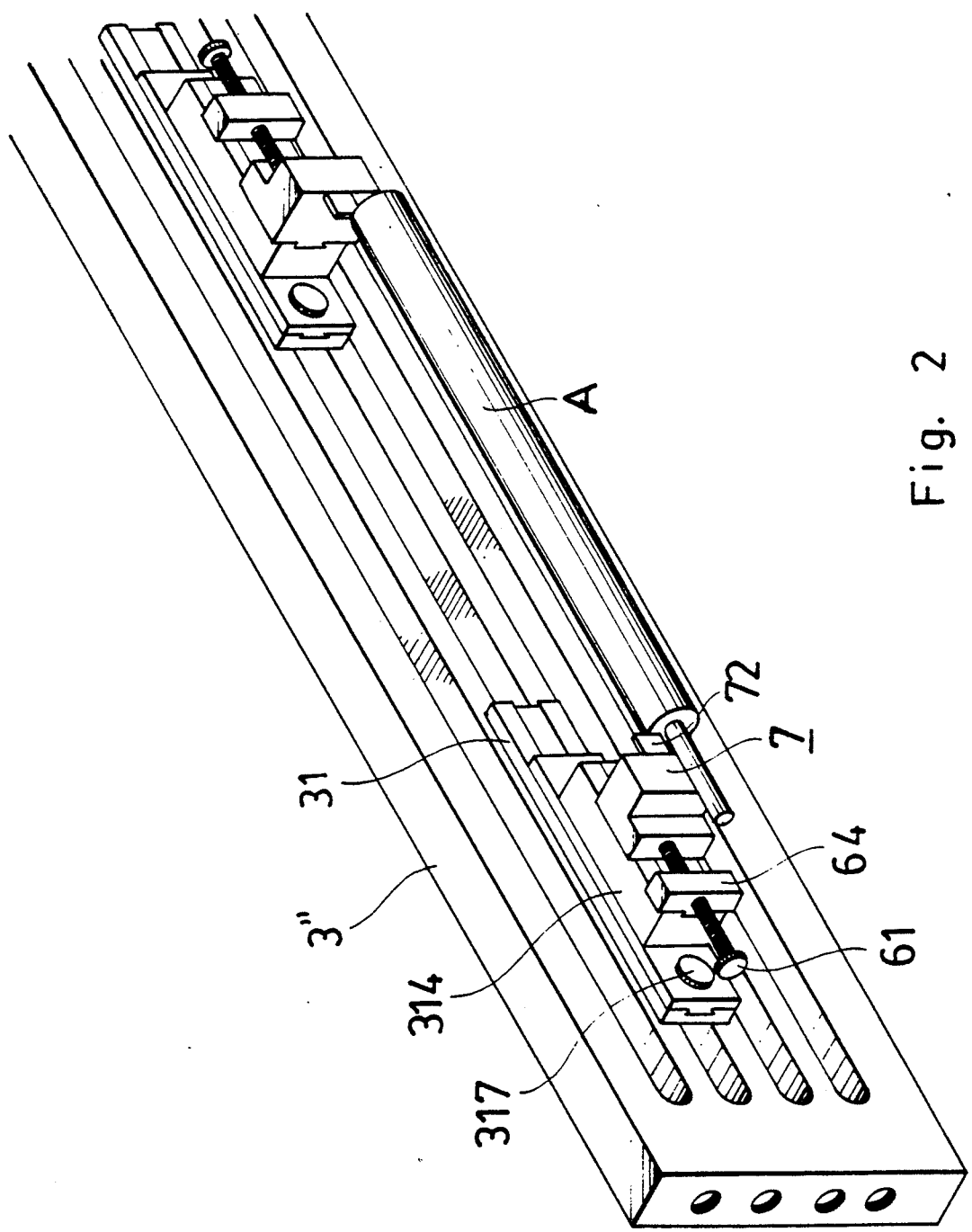
Figure 3:
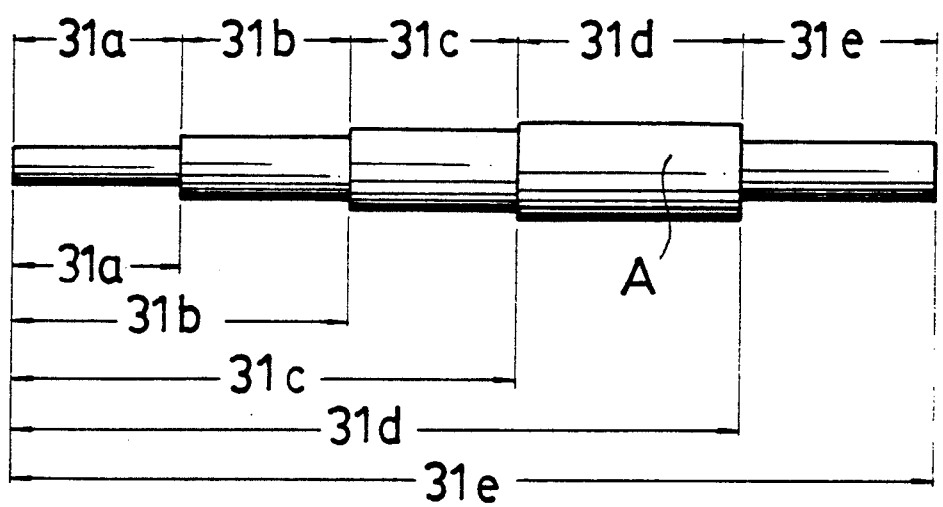
Figure 4:
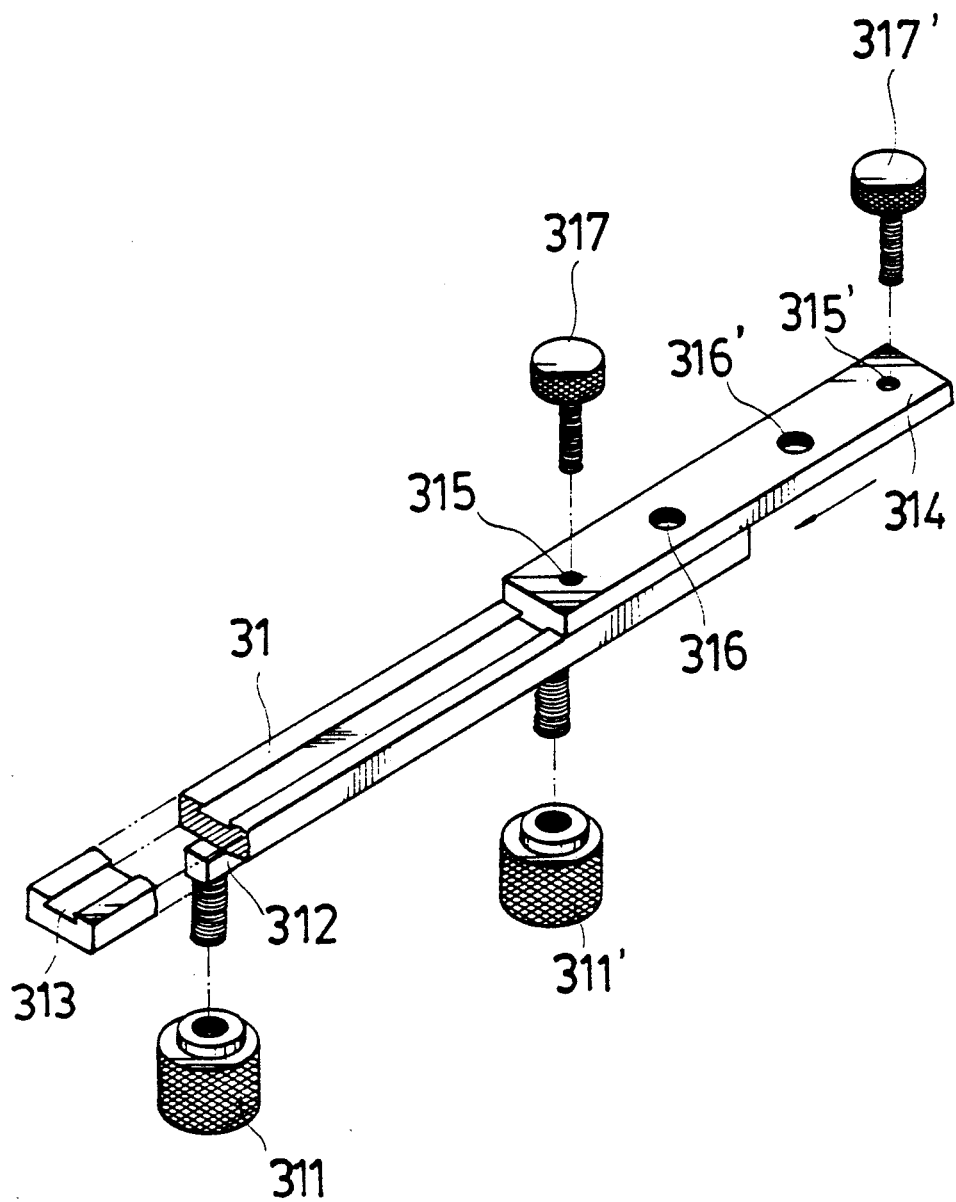
Figure 5:
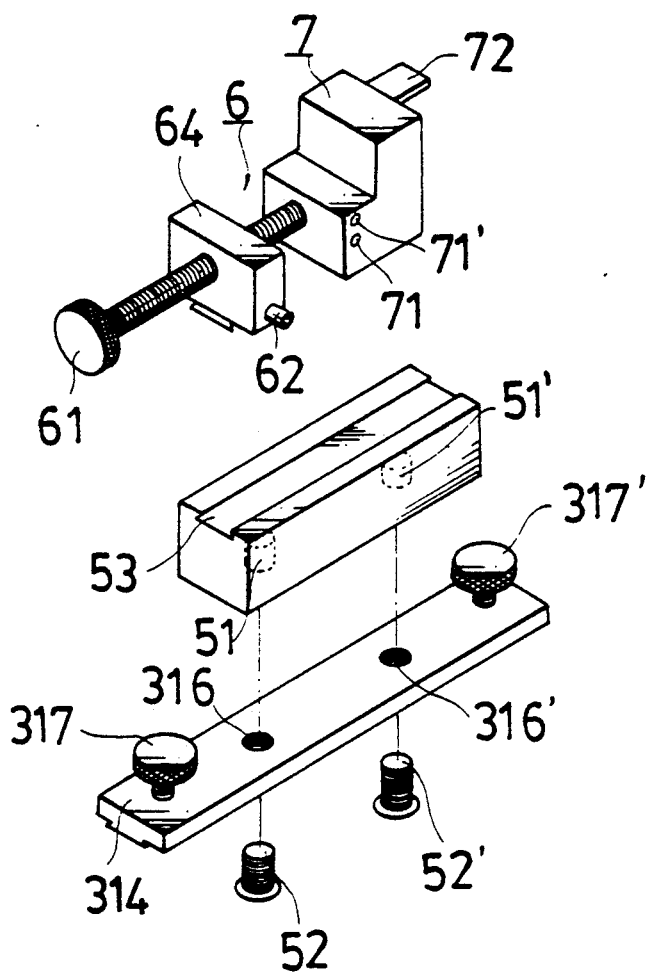
Figures 6, 7:
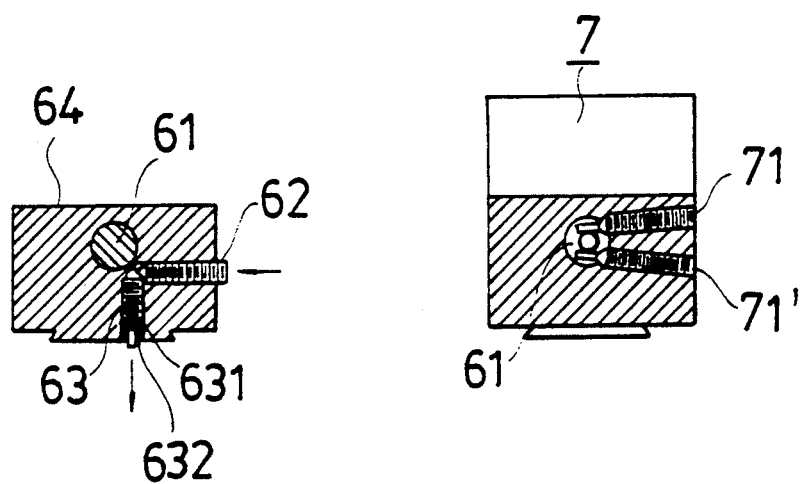
Figure 8:
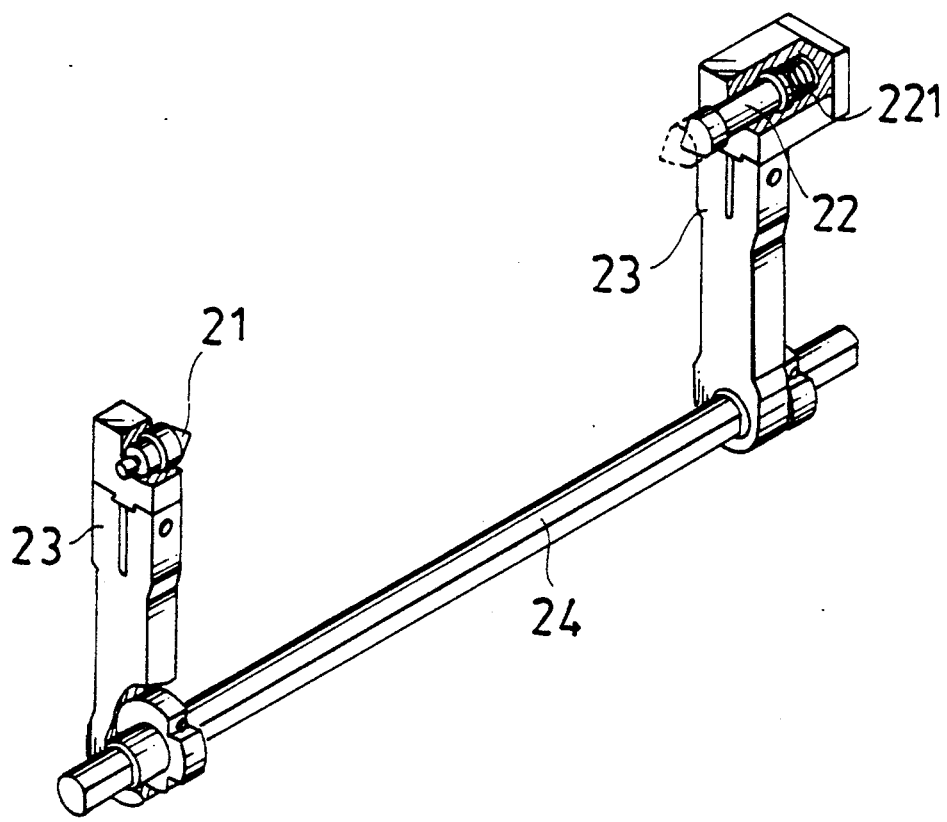
Figure 9:
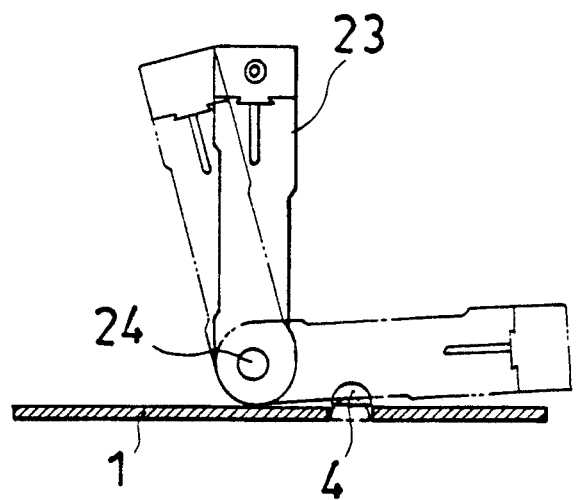

FIG. 1 a schematic drawing of a preferred embodiment of a measuring implement of the present invention;

FIG. 2 a schematic drawing of the arrangement of a measuring slide guide of the present invention;

FIG. 3 a schematic drawing of the measurement of an object to be measured of the present invention;

FIG. 4 a pictorial schematic drawing of a measuring base of the present invention;

FIG. 5 a pictorial schematic drawing of a micro adjustment device of the present invention;

FIG. 6 a sectional drawing of the fixed base of a micro adjustment device of the present invention;

FIG. 7 a sectional drawing of an anti-slippage mechanism of a micro adjustment device of the present invention;

FIG. 8 a pictorial schematic drawing of an assembly of a rocker arm pin of the present invention;

FIG. 9 a schematic drawing of the oscillation motion of a rocker pin of the present invention.

Referring to FIG. 1, a schematic drawing of a preferred embodiment of a measuring implement of the present invention, the slide guides (3,3') are screwed on the position (x) (y) of the side plates (12) and an adjustable slide guide is provided at position (z), so that one can utilize the three dimensional measuring space sufficiently and is not limited to single slide unit but is to build up several sets of measuring components to meet the requirement that the object to be measured for several dimensions synchronously; one thing is worth for mention that the installation procedure of the measuring bases (31, 31'31") and the slide guides (3, 3', 3") is firstly to install the measuring bases (31, 31', 31") on the slide guides (3, 3', 3"), then fixed the slide guides on the two side plates (12) and additionally the position (x) (y) (z) of the slide guides are respectively centrally set with the object to be measured, once the slide guides are screwed on, the measuring work can be started immediately.

Referring to FIG. 2, a schematic drawing of the arrangement of a measuring slide guide of the present invention, whereby the screws are fixed on the (x) (y) (z) position of the two side plates (12) of the base body (1), at the same time the measuring base (31) of the said slide guide (3) and the center of the measuring position are adjusted and are mutually connected with the measuring base (31) by means of the guide slots (32, 32') provided at the slot base of the slide guide (3), so that the measuring position of the measuring base (31) is quite accurate and consolidated, thus one can make axial or radial measurement to the object to be measured by means of the measuring base (31) of the measuring slide guide (3). For instance, the object to be measured (A) illustrated in FIG. 3 is in a stair-step form, if we want to measure the respective dimensions of each step, we can use the measuring base (31) of the slide base (3) of the said set, each set (31a, 31b, 31c, 31d, 31e) measures one section, or one takes an end as a starting point, then uses another measuring base (31a, b, c, d, e) of each slide guide (3) to measure the lengths from the starting point of each stage respectively, it is very convenient and increases effectively the application range of the said measurement, besides, when the object to be measured is held by the rock arm pin (2) and sent to the position to be measured, at the same time the rocker arm pin (2) is activated, one can control the same withdrawal motion of the measuring probe (72) on the measuring base (31) of each slide guide (3) (as it is illustrated in FIG. 2), so that the object to be measured can be reached to the position to be measured and once it reaches the set position, the measuring probe (72) will move forward to reach to the measuring position. The application of the said measuring implement is merely the operation of exchanging the object to be measured and one can carry out various kinds of measurement very fast and easily.

Referring to FIG. 4, a pictorial schematic drawing of a measuring base of the present invention, whereby the screws (311, 311') are fixed on the guide slots (32, 32') of the slide guide (3) and are mutually connected with the square slide blocks (312, 312' not shown) provided at the bottom of the measuring base (31) to ensure the accuracy and consolidation of the measuring position of the measuring base (31), when it is moving on the guide slot and one wants to make rough adjustment to the measuring probe (72), one should loose the internal hexagon set screws (317, 317') on the slot block seat (314) so that the said slide block seat (314) will be moved on the dovetail slot and reached to the proper position, finally screw the internal hexagon set screws (317, 317') tightly on. Such measuring base can be provided in standard design, to use screws to fix the measuring probe seat (5) on the fixed bore (316) and can be installed in diversity and to build a measuring unit with the slide block seats provided with various measuring probe seats (5) by means of the connection with dovetail slot.

Referring to FIG. 5, a pictorial schematic drawing of a micro adjustment device of the present invention, one can clearly see that on the slide block seat (314) and on the slide slot (53) of the measuring probe seat (5) fixed by two set screws (52, 52'), a micro adjustment device (6) is provided, comprises a fixed base arranged on the slide slot (53) of the measuring probe seat (5) and a bolt rod (61) provided on the said fixed base (64). When the measuring probe (72) of the probe seat (7) makes primary contact with the object to be measured and reaches to the initial resetting position, by means of the said bolt rod (61) be connected inside the probe seat (7) and then tighten the indirect set screws (62) on the fixed base (64) to push the locking mechanism (63) to lock the fixed base (64) on measuring probe seat (5) so as to fix the position of the probe seat (7), then by means of the turning of the said bolt rod (61) to effect micro adjustment function to the said probe seat (7) and in coordination with the display on the monitor, it can be fast and exactly adjusted to the correct resetting position. Besides, to use the anti-slippage screws (71, 71') of the probe seat (7) to fix the bolt rod (61) tightly to prevent the probe seat (7) from moving to avoid tolerance, thus to increase the accuracy of resetting operation. It is very convenient and is very effective in practical application.

Referring to FIG. 6, a sectional drawing of the fixed base (64) of a micro adjustment device (6) of the present invention, if one wants to fix the fixed base (64), screw the indirect set screw (62) tightly on to make the indirect locking mechanism (62) moving at the left side producing a downward pushing force against the locking mechanism (63), and when one moves the locking mechanism, the fixed base (64) will be locked on the measuring probe seat (5), and if one wants to loosen the said fixed base (64), just loosen the indirect set screw to make the indirect set screw (62) be withdrawn to the right side and without any effect with the locking mechanism (63), and due to the tension effect of the spring (631), the locking mechanism (63) is not contacted with the said measuring probe seat (5) and released the locking of the said fixed base (64).

Referring to FIG. 7, a sectional drawing of an anti-slippage mechanism of a micro adjustment device of the present invention, after screwing on the anti-slippage screws (71, 71'), because both of the two anti-slippage screws (71, 71') mutually will form an accuse offset angle, they will produce a clamping effect and get the bolt rod (61) firmly clamped, so that it will not result a slippage phenomenon and producing tolerance between the said bolt rod (61) and probe seat (7).

Referring to FIG. 8, a schematic drawing of an automatic material withdrawal device of the present invention, its base body (1) comprises a rocker arm pin and a set of measuring slide guides (3) which are arranged surrounding the said rocker arm pin (2), whereby the lifting pins (21, 22) of the rocker arm pin (2) is respectively arranged on an axial axle (24) with a rocker arm (23) and the said axial axle (24) is provided on the base body (1) and is rotary to activate the rocker arm (23) and the lifting pins (21, 22) to oscillate the angle motion synchronously, so that the object to be measured between the two lifting pins (21, 22) will be moved accordingly and operated between outside of the base body (1) and the position to be measured, and after completing the measurement job, it can move the object to be measured automatically outside the base body by means of the oscillation of the said axial axle (24) to facilitate the measuring personnel to make exchange, as for the control operation, before it reaches the position to be measured and be reset outside the base body (1), it can be controlled by means of a micro adjustment device (4) and to reach the resetting position by means of touching the rocker arm (23) (as it is illustrated in FIG. 9), and the activation of the said axial axle (24) can be controlled either by means of the commands of the computer installed on the machine or by means of the keying control of the measuring personnel (such kind of computerized device is a popular controller device and is not a feature of the present invention, therefore, its content will not be described here). A special feature of the present invention is that the two lifting pins (21, 22) of the said rocker arm pin (2), one of them is fixed type, and the other is movable type and the said movable lifting pin (22) can be pneumatically controlled and while the rocker arm pin (2) is moved out to the outside of the base body (1) and reaches to the resetting position, it will produce a withdrawal motion (as it is illustrated in FIG. 8) to facilitate the measuring personnel to take out and/or exchange the object to be measured, and after changing the object to be measured by means of the tension force of the expansion spring (221) provided at the back end of the lifting pin (22) to move the lifting pin (22) forwards (at this stage, the exhaust valve of the pneumatic device inside the seat body of the lifting pin (22) is in a open status to facilitate the forward motion of the lifting pin (22) to coordinate with the lifting pin (22) to hold the object to be measured (as it is illustrated in FIG. 8).

In general, as described above, the present invention is to provide a structure of "Multipoint measuring system with measuring mechanism for fast exchanging of chucking appliance and automatic material withdrawal", and is in fact a new creation of a prototype and in practical application it can achieve not only the micro adjustment operation of resetting operation and a fast and convenient operation but also can achieve an expanded measuring range and increase the convenience of the measuring operation to meet the customers' requirement for expanding the application range, thus it is an invention which can provide better performance than conventional product.

I claim:

1. A multipoint measuring system, comprising:
   a base with side plates, said side plates having slide hole seats;
   slide guides having guide slots, said slide guides being installed in said slide hole seats;
   automatic material withdrawal means coupled to said base for automatically withdrawing material, said automatic material withdrawal means having an axial axle, one or more rocker arms swingably disposed on at least one side of said axial axle, and one or more lifting pins disposed on said rocker arms;
   a measuring base disposed on said guide slots of said slide guides;
   a measuring probe seat disposed on said measuring base and having a measuring probe at its front end;
   a micro adjustment device disposed on said measuring probe seat, and
   wherein one or more of the slide guides are provided on the side plates such that several dimensions can be measured synchronously, with the measuring base having the measuring probe seat, micro adjustment device, and measuring probe disposed thereon, for measuring and automatically withdrawing material between the lift pins.

2. A multipoint measuring system as set forth in claim 1, wherein said automatic material withdrawal means further comprises location detection means for detecting the location of said rocker arms, and said one or more lifting pins include:
   at least one fixed lifting pin on an upper end of one of said rocker arms,
   at least one movable lifting pin provided on an upper end of an opposed rocker arm,
   wherein said lifting pins can pivot with said rocker arms with respect to said base, and said location detection means can detect the location of said rocker arms.

3. A multipoint measuring system according to claim 1, wherein said side plates further include several apertures adjacent to said slide hole seats to allow positional adjustment of said slide hole seats.

4. A multipoint measuring system as set forth in claim 1, wherein said measuring base further comprises two square slide blocks, which correspond to said guide slots of said slide guides, and
   a slide block seat, corresponding to a dovetail slot at an upper part of the measuring base, wherein said dovetail slot corresponds to said slide block seat for primary positional adjustment.

5. A multipoint measuring system according to claim 1, wherein said micro adjustment device comprises:
   a fixed base, and
   a bolt rod connecting said measuring probe seat to said fixed base,
   wherein said measuring probe seat can be adjusted through rotational movement of said bolt rod.

6. A multipoint measuring system according to claim 5, wherein said fixed base includes a locking means which comprises:
   a spring disposed in one side of an L-shaped aperture in said fixed base, and springably supporting a locking member therein,
   an indirect set screw on another side of the L-shaped aperture,
   wherein said fixed base is loosened and tightened by rotating the indirect set screw to effect the vertical movement of said locking member.

7. A multipoint measuring system as set forth in claim 1, wherein said measuring probe seat includes two threaded holes disposed at an acute angle with each other having two screws in said holes for tightening a bolt rod and preventing said measuring probe seat from moving.

* * * * *